US011998030B2

(12) United States Patent
Cramer et al.

(10) Patent No.: US 11,998,030 B2
(45) Date of Patent: Jun. 4, 2024

(54) NON-DAIRY DRINK WITH RICE AND PEA PROTEINS

(71) Applicant: SOCIETE DES PRODUITS NESTLE S.A., Vevey (CH)

(72) Inventors: Judith Cramer, Grosshochstetten (CH); Delphine Egli, La Tour-De-Peilz (CH); Danica Anja Jaggi-Kuypers, Richigen (CH); Monika Rapp, Zollikofen (CH); Delphine Bernadette Salvatore, Biglen (CH); Constantijn Ferdinand Willem Sanders, Bern (CH); Herve Vancheri, Corseaux (CH)

(73) Assignee: Societe des Produits Nestle S.A., Vevey (CH)

( * ) Notice: Subject to any disclaimer, the term of this patent is extended or adjusted under 35 U.S.C. 154(b) by 585 days.

(21) Appl. No.: 17/276,287

(22) PCT Filed: Sep. 17, 2019

(86) PCT No.: PCT/EP2019/074833
§ 371 (c)(1),
(2) Date: Mar. 15, 2021

(87) PCT Pub. No.: WO2020/058251
PCT Pub. Date: Mar. 26, 2020

(65) Prior Publication Data
US 2022/0312799 A1 Oct. 6, 2022

(30) Foreign Application Priority Data
Sep. 17, 2018 (EP) ..................................... 18194945

(51) Int. Cl.
*A23L 2/66* (2006.01)
*A23L 33/00* (2016.01)
(Continued)

(52) U.S. Cl.
CPC ............... *A23L 2/66* (2013.01); *A23L 33/115* (2016.08); *A23L 33/125* (2016.08); *A23L 33/15* (2016.08);
(Continued)

(58) Field of Classification Search
CPC . A23L 2/66; A23L 33/15; A23L 33/16; A23L 33/40; A23L 33/115; A23L 33/125;
(Continued)

(56) References Cited

U.S. PATENT DOCUMENTS 5,024,849 A * 6/1991 Rasilewicz ............ A23C 11/04
426/601
10,143,226 B1 * 12/2018 Foster ...................... A23J 3/14
(Continued)

FOREIGN PATENT DOCUMENTS

CA          2808126 C       12/2015
CN          103689099 A     4/2014
(Continued)

OTHER PUBLICATIONS

Russian Office Action for Appl No. 2021109863/10 dated Jul. 19, 2023.
(Continued)

*Primary Examiner* — Anthony J Weier
(74) *Attorney, Agent, or Firm* — K&L Gates LLP

(57) ABSTRACT

The present invention relates to a non-dairy drink including rice and pea proteins, such as to provide an appropriate nutritional profile and suitable taste.

10 Claims, 1 Drawing Sheet

(51) Int. Cl.
  *A23L 33/115* (2016.01)
  *A23L 33/125* (2016.01)
  *A23L 33/15* (2016.01)
  *A23L 33/16* (2016.01)
  *A23L 33/175* (2016.01)
  *A23L 33/185* (2016.01)

(52) U.S. Cl.
  CPC ............ *A23L 33/16* (2016.08); *A23L 33/175* (2016.08); *A23L 33/185* (2016.08); *A23L 33/40* (2016.08); *A23V 2002/00* (2013.01)

(58) Field of Classification Search
  CPC .. A23L 33/175; A23L 33/185; A23V 2002/00
  See application file for complete search history.

(56) References Cited

U.S. PATENT DOCUMENTS

| | | | | |
|---|---|---|---|---|
| 2007/0148305 | A1* | 6/2007 | Sherwood | A23L 2/68 426/583 |
| 2007/0148307 | A1* | 6/2007 | Sherwood | A23L 2/68 426/590 |
| 2007/0154614 | A1* | 7/2007 | Sherwood | A23L 3/0155 426/583 |
| 2008/0050498 | A1* | 2/2008 | Sherwood | A23L 2/39 426/594 |
| 2008/0206430 | A1 | 8/2008 | Avila | |
| 2009/0221502 | A1 | 9/2009 | Yatcilla et al. | |
| 2011/0236545 | A1* | 9/2011 | Brown | A23C 11/103 426/656 |
| 2011/0305798 | A1 | 12/2011 | Steen | |
| 2014/0356510 | A1 | 12/2014 | Schweizer et al. | |
| 2016/0058042 | A1* | 3/2016 | Venables | A23L 2/52 424/70.13 |
| 2016/0114002 | A1 | 4/2016 | Vincent | |
| 2017/0042209 | A1 | 2/2017 | Lau et al. | |
| 2017/0196243 | A1* | 7/2017 | Baxter | A23L 33/185 |
| 2019/0239535 | A1* | 8/2019 | Vadlamani | A21D 2/264 |

FOREIGN PATENT DOCUMENTS

| | | |
|---|---|---|
| CN | 105995058 A | 10/2016 |
| CN | 107242422 A | 10/2017 |
| CN | 107549541 | 1/2018 |
| CN | 107581438 A | 1/2018 |
| GB | 2494409 | 3/2013 |
| RU | 2591454 C2 | 7/2016 |
| WO | 2013148685 A1 | 10/2013 |
| WO | 2016029074 A1 | 2/2016 |
| WO | 2017001267 A1 | 1/2017 |

OTHER PUBLICATIONS

European Office Action for Appl No. 19 772 689.6-1105 dated Sep. 4, 2023.

* cited by examiner

NON-DAIRY DRINK WITH RICE AND PEA PROTEINS

CROSS REFERENCE TO RELATED APPLICATIONS

The present application is a National Stage of International Application No. PCT/EP2019/074833, filed on Sep. 17, 2019, which claims priority to European Patent Application No. 18194945.4, filed on Sep. 17, 2018, the entire contents of which are being incorporated herein by reference.

FIELD OF THE INVENTION

The present invention relates to a non-dairy drink comprising rice and pea proteins, such as to provide an appropriate nutritional profile and suitable taste.

BACKGROUND OF THE INVENTION

Numerous drinks, such as for example infant formulae, follow-on formulae, growing-up milks, cereal drinks for children, oral nutritional supplements and other nutritional and/or fortified milks for children or adults in powder or ready to drink form are based on animal milk, mainly cow or goat milk. There has been however a trend in recent years to provide alternatives to milk-based drinks and thus there is a tendency to replace part or all of the ingredients of animal origin by corresponding ingredients of plant origin. Namely, there is a trend towards the use of plant proteins as a partial or total replacement of milk proteins.

Drinks comprising plant proteins, alone or in admixture with milk proteins are known in the art and mainly focus on the dietary management of allergy to milk proteins or aim at providing specific amino acid profiles.

Plant proteins have amino acid profiles very different from human breast milk and from cow or goat milk. Therefore, non-dairy drinks with plant proteins are typically supplemented with free amino acids to meet the amino acid recommendations of the diverse types of consumers and to meet the recommendations/requirements of authorities in terms of protein quality. There would be a need to improve the formulation of compositions based on plant proteins to avoid or at least reduce the need to add free amino acids. Indeed addition of free amino acids makes the formulation of the product more complicated and expensive. Free amino acids are also detrimental to the taste of the drink and presence of significant amounts of free amino acids may lead to rejection of the product by the consumer. In addition, studies have described that free amino acids were not absorbed as well as amino acids brought by intact proteins or peptides. For example, A. Rérat, C. Simoes Nunes, F. Mendy and L. Roger, *Amino acid absorption and production of pancreatic hormones in non-anaesthetized pigs after duodenal infusions of a milk enzymatic hydrolysate or of free amino acids*, British journal of Nutrition, 1988, 60: pp 121-136 reports that the absorption of amino acids was greater, more rapid and more homogeneous after infusion of a partially hydrolysed milk protein, than after infusion of free amino acids. It is therefore desired to find solutions allowing to reduce or even avoid the need to add free amino acids in non-dairy drinks comprising proteins from plant origin only.

Plant proteins can also be problematic in that they contain significant amounts of contaminants and of endogenous anti-nutritional components, which may have harmful effects on consumers. It is therefore desirable to limit the level of contaminants and/or of anti-nutritional components in non-dairy drinks by selecting protein ingredients of high quality.

Pea and rice proteins are vegetarian proteins that have been widely used. For example WO2012027285A1 describes a nutritional product comprising pea hydrolysate having a specific amount of immunologically active pea antigen per gram of protein, for individuals who are intolerant or allergic to milk proteins. The pea proteins may be used in combination with a variety of milk and/or plant proteins. Exemplified are pure pea compositions, pea/soy compositions and pea/casein compositions.

Also, US2016/0309755A describes nutritional compositions comprising either a mix of milk protein with a choice of vegetable proteins or 100% vegetable protein compositions wherein at least half of the vegetable proteins are legume proteins exhibiting reduced phytic acid concentration.

Several documents describe infant formulae based on rice proteins, for example CN105495312A (infant formula based on red or black brown rice) or CN106136052 (infant formula with hydrolysate of whole grain rice). Several non-dairy drinks containing hydrolysed rice proteins are also commercially available.

Several documents disclose more or less complex mixes of plant proteins, which are combined to achieve an appropriate amino acids profile. Some of them include pea and rice proteins. For example, US2009/0221502A1 describes a combination of two or more proteins sources selected from soy, rice, pea, buckwheat, wheat, potato, sunflower, safflower, hops and mustard proteins. Several examples contain soy protein isolate, pea protein concentrate, rice protein isolate and L-lysine. The protein blend is to create a protein blend that closely matches human muscle tissue in terms of amino acid composition.

US2011/0305798A1 describes a protein powder that has an amino acid profile reflecting that of human mother's milk protein, and which can be included in food products. A wide list of possible animal and vegetarian protein sources are provided, among which rice and pea proteins are mentioned. Examples are provided with rice protein concentrate, soy protein isolate, pea protein isolate and purified potato protein.

US2017/0042209A1 describes a protein composition comprising sacha inchi protein, pea protein, rice protein and potato protein. The protein composition can be added in a beverage.

US2008/0206430A1 describes food compositions comprising a protein component consisting of soy, pea and rice proteins, including ready-to-drink products.

Pea and rice proteins being two non-allergenic and easy to source proteins, it would be desirable to provide non-dairy drinks containing pea and rice proteins, optionally with free amino acids, as only protein sources. These protein sources are particularly appreciated because they are safe for use even with very sensitive consumers, like infants up to 4-6 months. It would namely be desirable to provide compositions devoid of protein sources that are known as possible allergens, such as soy proteins or nut proteins. It is also desired to avoid ingredients which tend to have levels of contaminants that are not recommended for infants below 4-6 months, such as for example potato proteins, which often contain significant amount of glycoalkaloids.

Technical challenges are also associated with the use of plant proteins in non-dairy drinks. In particular, low solubility often makes it necessary to use hydrolysed proteins.

This is in particular the case for rice proteins, because intact rice proteins are very poorly soluble. It is therefore desired to provide improved drinks having pea proteins and hydrolysed rice proteins, optionally with free amino acids as only protein source. Hydrolysed rice proteins are however characterized by very unpleasant organoleptic properties and exhibit for example bitter, hydrolysed, burnt and astringent off-flavours. It is therefore desirable to improve the taste of non-dairy drinks comprising hydrolysed rice proteins. This problem is even more relevant when such plant proteins are used as sole source of protein in the composition. However, the above mentioned prior art documents are however silent with respect to the sensory properties of mixtures of pea and rice proteins.

Even when they are not hydrolysed, plant proteins typically have stronger and more characteristic flavour and taste compared to milk proteins. A marked plant protein taste, such as a vegetable taste, can lead to rejection of the drink by consumers. This is in particular true when the drink is intended for children. Too strong a characteristic plant protein taste is also disadvantageous in case there would be a need to provide flavoured variants of the non-dairy drink or to combine it with a variety of ingredients, such as fruit or chocolate for example, as plant protein taste may be hardly compatible with such flavours or ingredients. Therefore, there is a need for non-dairy drinks having organoleptic properties that are more easily accepted by consumers and even more preferably as neutral a taste as possible, by avoiding the prominence of tastes or flavours originating from the plant protein.

SUMMARY OF THE INVENTION

In a first aspect, the invention provides a non-dairy drink comprising a protein component consisting of a mixture of pea and rice proteins and optionally free amino acids wherein the rice protein is hydrolysed and wherein the pea proteins are present in an amount of 60 to 90 wt % based on the total weight of the protein component.

In a second aspect, the invention relates to the use of pea proteins to improve the sensory properties of a non-dairy drink comprising hydrolysed rice proteins and optionally free amino acids, wherein the pea proteins are used in an amount of at least 10 wt %, based on the total protein content in the non-dairy drink.

In a third aspect, the invention relates to the use of a rice protein to improve the sensory properties of a non-dairy drink comprising pea proteins and optionally free amino acids, wherein the hydrolysed rice proteins are used in an amount of at least 10 wt % based on the total protein content in the non-dairy drink.

In a fourth aspect, the invention relates to a method of providing nutrition to an individual comprising feeding the individual with a non-dairy drink of the invention.

BRIEF DESCRIPTION OF THE DRAWINGS

FIG. 1: Spider graph representing the FAO recommendations for selected essential amino acids for young children between 6 and 36 months (solid dark grey line) and for adults (solid light grey line), together with the content of such amino acids in pea isolate Pisane C9 (origin: Cosucra; black dotted line) and in rice protein hydrolysate Hyprol 5312 (origin: Kerry; black dashed line), as analysed according to the method described in Example 4. The scale refers to the amount of amino acid in mg per gram of protein.

DETAILED DESCRIPTION OF THE INVENTION

As used herein, the following terms have the following meanings.

The term "drink" as used herein refers to a composition to be consumed orally in liquid form. Such drink can be provided in liquid ready-to-drink form or in powder or granulate form to be reconstituted in a liquid before consumption. A "non-dairy drink" refers to a drink that does not contain milk-protein.

The term "infant" means a child under the age of 12 months. The expression "young child" means a child aged between one and three years, also called toddler. The expression "child" means a child between three and eight years of age.

In a particular embodiment the non-dairy drink of the present invention is a hypoallergenic drink. The term "hypoallergenic" associated with the non-dairy drink of the invention means that such drink is unlikely to cause allergic reactions.

The expression "infant formula" as used herein refers to a foodstuff intended for particular nutritional use by infants during the first months of life and satisfying by itself the nutritional requirements of this category of person (Article 2(c) of the European Commission Directive 91/321/EEC 2006/141/EC of 22 Dec. 2006 on infant formulae and follow-on formulae and COMMISSION DELEGATED REGULATION (EU) 2016/127). It also refers to a nutritional composition intended for infants and as defined in Codex Alimentarius (Codex STAN 72-1981) and Infant Specialities (incl. Food for Special Medical Purpose).

A "follow-up formula" and a "follow-on formula" are herein used interchangeably and both refer to a second age liquid food for use as a liquid part of the weaning diet from the 6th month of age. It constitutes the principal liquid element in the progressively diversified diet of this category of person.

The expression "growing-up drink" (or GUD) refers to a drink comprising protein, fats and carbohydrates, generally with added vitamins and minerals, that is intended for young children or children, from 12 months of age and up to eight years. Growing-up drinks are usually not used as sole source of nutrition and include for example young child formulae, flavoured drinks and fortified flavoured drinks, such as defined in the different jurisdictions.

An "oligosaccharide" is a saccharide polymer containing a small number (typically three to ten) of simple sugars (monosaccharides).

The term "prebiotic" means a substrate that is selectively utilized by host microorganisms conferring a health benefit (Gibson G R, Hutkins R., Sanders M. E., Prescott L., Reimer R. A., Salminen S. J., Scott K., Stanton C., Swanson K. S., Cani P. D., Verbeke K., Reid G.; *The International Scientific Association for Probiotics and Prebiotics (ISAPP) consensus statement on the definition and scope of prebiotics; Nature reviews; Gastroenterology and hepatology* 2017; 14:491-502).

The term "probiotic" means live microorganisms that, when administered in adequate amounts, confer a health benefit on the host (FAO/WHO, 2002 and C. Hill, F. Guarner, G. Reid, G. R. Gibson, D. J. Merenstein, B. Pot, L. Morelli, R. B. Canani, H. J. Flint, S. Salminen, P. C. Calder and M. E. Sanders; *Expert consensus document: The International Scientific Association for Probiotics and Prebiotics consensus statement on the scope and appropriate use of the*

*term probiotic; Nature reviews Gastroenterology & hepatology;* 2014; 11:506-514). The microbial cells are generally bacteria or yeasts.

The term "cfu" should be understood as colony-forming unit.

"Pea" also named dried or split pea refers to *Pisum sativum* L.

All percentages are by weight unless otherwise stated.

In addition, in the context of the invention, the terms "comprising" or "comprises" do not exclude other possible elements. The non-dairy drink of the present invention, including the many embodiments described herein, can comprise, consist of, or consist essentially of the essential elements and limitations of the invention described herein, as well as any additional or optional ingredients, components, or limitations described herein or otherwise depending on the needs.

Any reference to prior art documents in this specification is not to be considered an admission that such prior art is widely known or forms part of the common general knowledge in the field.

The invention will now be described in further details. It is noted that the various aspects, features, examples and embodiments described in the present application may be compatible and/or combined together.

Non-Dairy Drink

The non-dairy drink of the present invention comprises a protein component consisting of a mixture of pea protein, hydrolysed rice proteins and optionally free amino acids, wherein the pea proteins are present in an amount of 10 to 90 wt %, preferably 10 to 80 wt %, more preferably 10 to 60 wt %, based on the total weight of the protein component. In another embodiment, the pea proteins are present in an amount of 20 to 90 wt %, preferably 20 to 80 wt %, more preferably 20 to 60 wt %, based on the total weight of the protein component. In a further embodiment the pea proteins are present in an amount of 40 to 90 wt %, preferably 40 to 80 wt %, more preferably 40 to 60 wt %, based on the total weight of the protein component. In a most preferred embodiment, the pea proteins are present in an amount of 60 to 90 wt %, preferably 60 to 80 wt %, more preferably about 60 wt %, based on the total weight of the protein component.

In one particular embodiment, the non-dairy drink of the present invention comprises a protein component consisting of a mixture of pea protein and hydrolysed rice proteins, wherein the pea proteins are present in an amount of 10 to 90 wt %, preferably 10 to 80 wt %, more preferably 10 to 60 wt %, based on the total weight of the protein component. In another embodiment, the pea proteins are present in an amount of 20 to 90 wt %, preferably 20 to 80 wt %, more preferably 20 to 60 wt %, based on the total weight of the protein component. In a further embodiment the pea proteins are present in an amount of 40 to 90 wt %, preferably 40 to 80 wt %, more preferably 40 to 60 wt %, based on the total weight of the protein component. In a most preferred embodiment, the pea proteins are present in an amount of 60 to 90 wt %, preferably 60 to 80 wt %, more preferably about 60 wt %, based on the total weight of the protein component.

Amounts of pea of 80% or less, based on the total weight of the protein component are preferred because higher amounts cause an increase of the viscosity of the non-dairy drink, which makes the manufacturing process more difficult and may be undesirable. This is particular the case when the non-dairy drink is spray-dried. Non dairy drink comprising more than 80 wt % of pea protein, based on the total weight of the protein component typically have to be spray-dried with a lower total solids content, which leads to an increase in the manufacturing costs and higher energy consumption.

The pea protein source can be provided in various formats, such as in the form of a concentrate, of an isolate, of an hydrolysate or of pea flour. The type of protein source will be selected based on various criteria, such as the protein content in the ingredient and the type of drink. For example pea flour may be used for infant cereal drinks or for other drinks where a higher viscosity is desired. Such protein ingredients typically are a not pure proteins but may comprises other compounds. The percentages recited in the present application refer to the pure protein content originating from the ingredient.

The pea proteins, as defined above may be intact, hydrolysed or a mixture of intact and hydrolysed proteins. The hydrolysed proteins may be partially or extensively hydrolysed.

The hydrolysed rice protein may be partially or extensively hydrolysed.

In case free amino acids are added, the amino acids are preferably lysine and/or methionine, preferably L-lysine and/or L-methionine.

The non-dairy drink of the present invention is advantageous from a sensory point of view in that the taste of a mixture of pea and hydrolysed rice proteins, optionally with free amino acids, has a more balanced flavour and taste profile than pea or rice protein alone. Indeed hydrolysed rice proteins and pea proteins both impart strong characteristic flavour and taste to the non-dairy drinks to which they are added. In particular, hydrolysed rice proteins exhibit very strong bitter, hydrolysed, burnt and astringent off-notes, which can lead to rejection of the product by the consumers. Bitterness is indeed a significant cause of rejection of a drink by young children and even many adults. Burnt off-notes, which can be defined as an off-flavour reminding the odour of burnt tyres, are also commonly rejected by consumers of all ages. An hydrolysed flavour, which reminds of cooked potato/beans, is also perceived as unpleasant in drinks. It is desired to reduce such off-notes. Addition of pea protein to hydrolysed rice proteins has been found by the present inventors to significantly mitigate the bitter, burnt and hydrolysed off-notes imparted by the hydrolysed rice proteins. The present inventors have also shown that admixing pea protein with hydrolysed rice proteins has a positive effect in reducing the astringency of the product.

The positive effect on reduction of the negative sensory attributes was observed with amounts of pea as low as 10 wt % based on the total weight of the protein component. The unpleasant sensory attributes continue to reduce significantly with the increase of the amount of pea protein. It has also been found that amounts of pea from 60 wt % based on the total weight of the protein component were able to reduce the bitterness, burnt, hydrolysed and astringent off-notes to such a level that such products cannot be distinguished from those having only pea protein as a protein component. The bitterness, and the burnt and hydrolysed off-notes are even reduced to a non-perceivable level.

On the other hand, pure pea proteins also have a characteristic taste that is not always well accepted by consumers, in particular in drinks. Such characteristic pea taste is namely difficult to combine with flavours, fruits, chocolate or other various ingredients that one would like to include in the non-dairy drink. The present inventors have found that addition of hydrolysed rice protein was able to reduce the perception of the pea tastes. Amounts of hydrolysed rice proteins from 10 wt %, preferably from 20 wt % based on the total weight of the protein component were able to significantly reduce the perception of the pea taste.

Thus a combination of pea protein with hydrolysed rice protein, with the pea protein being present in the above-described amounts positively impacts the taste and thus the acceptance of the non-dairy drink by significantly mitigating undesirable sensory attributes originating from the individual protein sources. The present invention advantageously provides a combination of proteins reducing the off-taste imparted by the plant protein to the non-dairy drink.

In a preferred embodiment the protein component described above has an amino acid profile that fulfils the nutritional requirements of individuals to which the drink is targeted and/or provides appropriate amino acid scoring patterns, commonly recognized in the scientific community and in particular those defined by international authorities such as FAO, without requiring addition of free amino acids. Thus in a preferred aspect of the invention the protein component consists of a mixture of pea protein and hydrolysed rice protein, wherein the pea protein is present in any of the above-described amounts. In such case, the protein component may contain some free amino acids that are endogenous to the pea and/or hydrolysed rice protein, but does not contain any free amino acids added separately, which advantageously avoids off-notes brought by such free amino acids.

In a preferred aspect, the protein component has the following amino acid content:
at least 48 mg of lysine per gram of protein; and/or
at least 23 mg of total methionine and cysteine per gram of protein.

Such protein component is advantageously particularly suitable for adults and children from three years of age.

In more preferred aspect, the protein component has the following amino acid content:
at least 57 mg of lysine per gram of protein; and/or
at least 27 mg of total methionine and cysteine per gram of protein.

Such protein component is advantageously is even more advantageous because it also covers the needs of infants and children between six months and three years of age.

In an even more preferred embodiment, the protein component has the following amino acid content:
at least 69 mg of lysine per gram of protein; and/or
at least 33 mg of total methionine and cysteine per gram of protein.

Such protein component is particularly advantageous in that it fulfils the recommendations of consumers of all ages, including infants from birth to six months of age.

In a more preferred aspect the protein component consists of pea protein and hydrolysed rice protein and has one of the above-described specific amino acid contents.

Admixing pea proteins and hydrolysed rice proteins is advantageous for several reasons. First of all, pea proteins and hydrolysed rice proteins have complementary amino acids profiles. The present inventors have analysed the amino acid content of several commercial pea protein ingredients and have found that pea is typically rich in lysine, whereas the amounts of methionine and cysteine in pea are rather low. On the other hand, hydrolysed rice proteins are rich in methionine and cysteine, but have lower amounts of lysine. Thus, pea and hydrolysed rice proteins can be admixed such as to optimize the amino acid content of the overall protein component. Addition of hydrolysed rice protein will compensate for the methionine and cysteine missing in pea proteins and pea proteins will reversely compensate for the lysine missing in the hydrolysed rice protein. It is therefore specifically advantageous to admix pea and hydrolysed rice proteins.

The ratio of pea and hydrolysed rice proteins can be adjusted based on the amount of lysine and of total methionine and cysteine in the protein ingredients such as to achieve the desired amino acid content, taking into account any supplementation with free amino acids.

Thus admixing pea proteins and hydrolysed rice proteins is advantageous in that it avoids or at least reduces the need to add free amino acids into the non-dairy drink. Addition of free amino acids is often needed in products having protein components based totally or partially on plant proteins, to ensure fulfilment of the essential amino acids daily requirements when the non-dairy drink is used as sole source of nutrition, or to provide appropriate amino acid scoring patterns, commonly recognized in the scientific community and in particular those defined by international authorities such as FAO.

Such free amino acids are however not desirable, because they impair the taste of the non-dairy drink, namely by conferring off-tastes and off-flavours, such as for example bitterness or sulphuric off-flavour, depending on the added free amino acids. Also, addition of free amino acids makes the process of manufacture of the non-dairy drink more complicated and costly. Indeed, technical hurdles are associated with the addition of free amino acids, namely because free amino acids are difficult to dissolve, thus requiring longer time to ensure complete dissolution and risk of sedimentation of undissolved amino acid crystals in tanks.

When pea proteins are admixed with hydrolysed rice proteins in the ratios provided in the present invention, addition of free amino acids is reduced or even completely avoided. Even though it is preferred to mix pea and hydrolysed rice proteins such as to completely avoid the need to add free amino acids, there is already a significant advantage in reducing the amount of such free amino acids, at least to reduce the off-taste.

The amounts of specific amino acids may slightly vary between different pea or hydrolysed rice protein source, for example due to the methods of purification of the protein component from the plant. In a preferred embodiment, the pea protein has a lysine content of at least 60 mg, preferably at least 65 mg, more preferably at least 70 mg of lysine per gram of pea protein. In another preferred embodiment, the hydrolysed rice protein, has a content of total methionine and cysteine of at least 30 mg, preferably at least 35 mg, more preferably at least 40 mg, more preferably at least 45 mg per gram of the hydrolysed rice protein.

It is also advantageous to combine pea proteins, with hydrolysed rice proteins, because such classes of proteins contain different types of anti-nutritional compounds and of contaminants. Plant proteins typically contains contaminants, for example due to absorption from the soil or due to treatments applied for the cultivation of the plant. Such contaminants may be harmful. Plant proteins also commonly endogenously contain anti-nutritional compounds, which are detrimental to the absorption of other specific nutrients or as such are harmful to the consumer health. Such anti-nutritional compounds and contaminants reduce the nutritional adequacy of diets based on plant protein. Although methods of extraction of proteins from plants are developed to reduce that amount of contaminants and of anti-nutritional compounds, such undesired components typically remain at least in trace amounts in the protein ingredient. Careful selection of ingredients with low amounts of anti-nutritional compounds and contaminants is therefore not sufficient per se to avoid the presence of such un-desired components.

The present invention provides a particularly advantageous combination of plant proteins reducing the impact of contaminants and anti-nutritional compounds. Hydrolysed rice proteins typically contain traces of arsenic, whereas pea proteins typically comprise significantly lower amounts of arsenic. Combining the hydrolysed rice protein containing arsenic with pea protein that does not contain such contaminant therefore reduces the overall content of arsenic and increases the safety of the non-dairy drink. In turn, pea proteins typically contain lectin and phytate, which are present in significantly lower amounts in hydrolysed rice. Thus it is advantageous to admix hydrolysed rice protein with pea protein such as to reduce the phytate content of the overall protein component.

The non-dairy drink advantageously is hypoallergenic. Indeed, pea proteins, both in intact and in hydrolysed form, and hydrolysed rice proteins are advantageously characterized by a low allergenicity.

The non-dairy drink of the present invention is a composition to be consumed orally in liquid form. Non-limiting examples of non-dairy drinks according to the present invention include an infant formula, a follow-up or follow-on formula, a growing-up drink, a cereal drink, such as infant cereals, a flavoured drink, a liquid oral supplement and a fortified drink, which can be fortified with minerals, vitamins and/or with a high protein content.

The non-dairy drink can be in liquid ready to drink form, in the form of a liquid concentrate to be diluted in water, or in powder form to be reconstituted in water before consumption.

In a preferred aspect, the non-dairy drink comprises a fat component and a carbohydrate component, in addition to the protein component described above.

In a preferred aspect of the invention, the growing-up drink comprises starch. Preferably, starch is present in an amount of 2 to 15 wt % preferably 4 to 12 wt %, more preferably 5 to 10 wt %, based on the total dry weight of the non-dairy drink. Starch is advantageous in that it helps to the stability of the non-dairy drink and in particular avoids the separation of the proteins.

The amounts of micro- and macronutrients and the energy content of the non-dairy drinks of the present invention can vary within wide ranges, depending on the target consumer population and the product type. Typically supplements will be fortified with more energy and/or specific nutrients, to meet specific needs of particular consumers. On the other hand, products intended as sole source of nutrients, such as for example infant formula or as one of the mains source of nutrients, such as follow-on formulae, need to have a very balanced nutrient profile. The following part provides exemplary ranges for energy and for the main nutrient content of the non-dairy drink of the invention.

The non-dairy drink of the present invention preferably has an energy content of 45 to 200 kcal per 100 mL.

The non-dairy drink also preferably has a protein content in the range of 1.5 to 8 g/100 kcal, preferably 1.5 to 6.5 g/100 kcal.

The non-dairy drink according to the present invention typically contains available (digestible) carbohydrates, preferably in an amount of at most 14 g/100 kcal, preferably at most 12.5 g/100 kcal. These are added to confer sweetness to the product and/or to provide energy.

The digestible carbohydrates may comprise any commonly used carbohydrates such as sucrose, lactose, maltodextrin, isomaltulose. In a preferred embodiment, the carbohydrate component is free of sucrose. In another preferred embodiment, the carbohydrate component is free of lactose. This is advantageous for consumers willing to follow a vegan diet and also to avoid lactose hypersensitivity and intolerance. It is also preferred that energy provided by free sugars amounts to at most 10% for the energy provided by the product as a whole. Free sugars are defined by the World Health Organisation as including monosaccharides and disaccharides added to foods and beverages by the manufacturer, cook or consumer, and sugars naturally present in honey, syrups, fruit juices and fruit juice concentrates. In a particular embodiment, at least part of the digestible carbohydrates are provided in the form of honey.

The non-dairy drink according to the present invention may also comprise oligosaccharide(s) and/or at least a fiber(s) and/or at least a precursor(s) thereof, for infants and young children the fibre is preferably in an amount of up to 15 g/L. The other oligosaccharide and/or fiber and/or precursor thereof may be selected from the list comprising human milk oligosaccharides (HMOs), galacto-oligosaccharides (GOS), bovine milk oligosaccharides, fructo-oligosaccharides (FOS), inulin, xylooligosaccharides (XOS), polydextrose, soluble corn fiber, acacia gum, pectin and any combination thereof.

Suitable commercial products that can be used to prepare the non-dairy drink according to the invention include combinations of FOS with inulin and can be sourced from a diversity of suppliers.

HMOs are highly resistant to enzymatic hydrolysis, indicating that they may display essential functions not directly related to their caloric value. It has especially been illustrated that they play a vital role in the early development of infants and young children, such as the maturation of the immune system. Many different kinds of HMOs are found in the human milk. Each individual oligosaccharide is based on a combination of glucose, galactose, sialic acid (N-acetylneuraminic acid), fucose and/or N-acetylglucosamine with many and varied linkages between them, thus accounting for the enormous number of different oligosaccharides in human milk—over 130 such structures have been identified so far. Almost all of them have a lactose moiety at their reducing end while sialic acid and/or fucose (when present) occupy terminal positions at the non-reducing ends. The HMOs can be acidic (e.g. charged sialic acid containing oligosaccharide) or neutral (e.g. fucosylated oligosaccharide).

Examples of HMOs include fucosylated oligosaccharides having a fucose residue and being of a neutral nature. Some examples are 2-FL (2'-fucosyllactose), 3-FL (3-fucosyllactose), difucosyllactose, lacto-N-fucopentaose (e.g. lacto-N-fucopentaose I, lacto-N-fucopentaose II, lacto-N-fucopentaose III, lacto-N-fucopentaose V), lacto-N-fucohexaose, lacto-N-difucohexaose I, fucosyllacto-N-hexaose, fucosyllacto-N-neohexaose, difucosyllacto-N-hexaose I, difucosyllacto-N-neohexaose II and any combination thereof.

Other examples of HMOs include N-acetylated oligosaccharide(s), which encompass both "N-acetyl-lactosamine" and "oligosaccharide(s) containing N-acetyl-lactosamine". They are neutral oligosaccharides having an N-acetyl-lactosamine residue. Suitable examples are LNT (lacto-N-tetraose), para-lacto-N-neohexaose (para-LNnH), LNnT (lacto-N-neotetraose) and any combinations thereof. Other examples are lacto-N-hexaose, lacto-N-neohexaose, para-lacto-N-hexaose, para-lacto-N-neohexaose, lacto-N-octaose, lacto-N-neooctaose, iso-lacto-N-octaose, para-lacto-N-octaose and lacto-N-decaose.

Other examples of HMOs are sialylated oligosaccharides, which are charged sialic acid containing oligosaccharide, i.e.

an oligosaccharide having a sialic acid residue. They have an acidic nature. Some examples are 3-SL (3' sialyllactose) and 6-SL (6' sialyllactose).

The non-dairy drink according to the present invention may optionally also comprise at least one precursor of oligosaccharide. There can be one or several precursor(s) of oligosaccharide. For example the precursor of human milk oligosaccharide is sialic acid, fucose or a mixture thereof. In some particular embodiments the non-dairy drink comprises sialic acid.

In a particular embodiment, the non-dairy drink contains only oligosaccharides of plant origin, such that the non-dairy drink is suitable for a vegetarian or a vegan diet. In such case the oligosaccharide is preferably selected from fructo-oligosaccharides (FOS), inulin, xylooligosaccharides (XOS), polydextrose, soluble corn fiber, acacia gum, pectin and any combination thereof.

The non-dairy drink of the present invention preferably comprises fat in an amount of 2.2 to 6 g/100 kcal. The fat component can comprise milk fat or vegetable fat. Some suitable fat sources include palm oil, structured triglyceride oil, high oleic sunflower oil and high oleic safflower oil, medium-chain-triglyceride oil, low erucic acid rapeseed oil sunflower oil. The essential fatty acids linoleic and a-linolenic acid may also be added, as well as small amounts of oils containing high quantities of preformed arachidonic acid and docosahexaenoic acid such as fish oils, algae oils or microbial oils. Long chain polyunsaturated fatty acids are particularly advantageous, as their consumption is associated with various health benefits.

In a preferred aspect, the fat component consists only of vegetable fat, such as to be suitable for vegetarian or vegan diets.

The non-dairy drink of the invention may also contain all vitamins and minerals understood to be essential in the daily diet and in nutritionally significant amounts. Minimum requirements have been established for certain vitamins and minerals. Examples of minerals, vitamins and other nutrients optionally present in the non-dairy drink of the invention include vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chlorine, potassium, sodium, selenium, chromium, molybdenum, taurine, and L-carnitine. Minerals are usually added in salt form. The presence and amounts of specific minerals and other vitamins will vary depending on the intended population.

In a preferred aspect of the present invention, the non-dairy drink is specifically fortified such as to improve the nutrient content of vegetarian non-dairy drink. The present inventors have found that it is particularly advantageous to fortify a vegetarian non-dairy drink with one or more of the following nutrients in the following amounts: from 0.05 to 2.2 ug/100 kcal of vitamin B12, from 0.7 to 39 mg/100 kcal of iron, from 0.2 to 39 mg/100 kcal of zinc, from 33 to 1400 mg/100 kcal of calcium and/or from 0.3 to 42 ug/100 kcal of vitamin D. Indeed they have identified that such vitamins and minerals are typically present in smaller amount in a non-supplemented vegetarian or plant-based diet.

The non-dairy drink of the present invention can further comprise at least one probiotic microorganism (or probiotic strain), such as a probiotic bacterial strain.

The probiotic microorganisms most commonly used are bacteria and yeasts of the following genera: *Lactobacillus* spp., *Streptococcus* spp., *Enterococcus* spp., *Bifidobacterium* spp. and *Saccharomyces* spp. In a preferred aspect the probiotic bacteria is a *Bifidobacterium* and/or *Lactobacillus*.

Non-(imitative examples of suitable probiotic bacterial strains include *Lactobacillus rhamnosus* ATCC 53103 available from Valio Oy of Finland under the trademark LGG, *Lactobacillus rhamnosus* CGMCC 1.3724, *Lactobacillus paracasei* CNCM 1-2116, *Lactobacillus johnsonfi* CNCM 1-1225, *Streptococcus salivarius* DSM 13084 sold by BLIS Technologies Limited of New Zealand under the designation K12, *Bifidobacterium lactis* CNCM 1-3446 sold inter alia by the Christian Hansen company of Denmark under the trademark Bb 12, *Bifidobacterium longum* ATCC BAA-999 sold by Morinaga Milk Industry Co. Ltd. of Japan under the trademark BB536, *Bifidobacterium breve* sold by Danisco under the trademark Bb-03, *Bifidobacterium breve* sold by Morinaga under the trade mark M-16V, *Bifidobacterium infantis* sold by Procter & Gamble Co. under the trademark Bifantis and *Bifidobacterium breve* sold by Institut Rosell (Lallemand) under the trademark R0070.

The non-dairy drink according to the invention may contain from 10e3 to 10e12 cfu of probiotic strain, more preferably between 10e7 and 10e12 cfu such as between 10e8 and 10e10 cfu of probiotic strain per g of non-dairy drink on a dry weight basis.

In one embodiment the probiotics are viable. In another embodiment the probiotics are non-replicating or inactivated. There may be both viable probiotics and inactivated probiotics in some other embodiments. Probiotic components and metabolites can also be added.

If necessary, the non-dairy drink of the invention may contain emulsifiers and stabilisers such as soy lecithin, sunflower lecithin, citric acid esters of mono- and diglycerides, gums such as guar gum or carrageenan, and the like.

The non-dairy drink of the invention may also contain other substances which may have a beneficial effect such as lactoferrin, nucleotides, nucleosides, and the like.

The non-dairy drink of the invention may also contain carotenoid(s). In some particular embodiments of the invention, the non-dairy drink of the invention does not comprise any carotenoid.

The non-dairy drink of the present invention can further comprise any ingredient that is desired to impart hedonic or health benefits, such as for example fruit juices, fruit puree, fruit pieces, cereals, flavours, chocolate, caramel, honey, spices or herbs. The fact that typical flavour and taste of the pea and hydrolysed rice proteins are mitigated by the admixture of both types of proteins makes the non-dairy drink of the present invention particularly suitable for varying the flavours and tastes and for admixture with a large variety of ingredients.

The non-dairy drink according to the invention may be prepared in any suitable manner.

For example, the non-dairy drink can be prepared by blending together the protein source, the carbohydrate source and the fat source in appropriate proportions. If used, the emulsifiers may be included at this point. The vitamins and minerals may be added at this point but they are usually added later to avoid thermal degradation. Any lipophilic vitamins, emulsifiers and the like may be dissolved into the fat source prior to blending. Water, preferably water which has been subjected to reverse osmosis, may then be mixed in to form a liquid dispersion. The temperature of the water is conveniently in the range between ambient temperature about 20° C. and about 80° C. to aid dispersal of the ingredients. Commercially available liquefiers may be used to form the liquid mixture. Heat sensitive component such as vitamins will be added and the mixture and the pH is adjusted.

The liquid mixture is then homogenised, for example in two stages. The liquid mixture may then be thermally treated to reduce bacterial loads, by rapidly heating the liquid mixture to a temperature in the range between about 80° C. and about 150° C. for a duration between about 5 seconds and about 5 minutes, for example. This may be carried out by means of steam injection, an autoclave or a heat exchanger, for example a plate heat exchanger. Then, the liquid mixture may be cooled to between about 60° C. and about 85° C. for example by flash cooling. The liquid mixture may then be again homogenised, for example in two stages between about 10 MPa and about 30 MPa in the first stage and between about 2 MPa and about 6 MPa in the second stage.

If the final product is to be a powder, the homogenised mixture it concentrated, for example through evaporation and the mixture is then transferred to a suitable drying apparatus such as a spray dryer or freeze dryer and converted to powder. The powder should have a moisture content of less than about 5% by weight.

If a liquid non-dairy drink is preferred, the homogenised mixture may be sterilised then aseptically filled into suitable containers or may be first filled into the containers and then retorted. Alternatively, the product may be a chilled or refrigerated product produced using any suitable processing such as thermisation, pasteurisation or sterilization.

In one particular aspect the invention relates to a non-dairy drink comprising
 a protein component consisting of pea protein, hydrolysed rice protein and optionally free amino acids, wherein the pea protein is present in an amount of 60 to 90 wt %, based on the total weight of the protein component;
 vegetable oil; and
 at least one carbohydrate.

According to one preferred aspect of the invention, the pea protein is a pea protein isolate, preferably a pea isolate having a protein content of at least 70 wt %, preferably at least 75 wt %, most preferably at least 79 wt %, most preferably about 79 wt % based on the total weight of the pea protein isolate.

According to one preferred aspect of the invention, the hydrolysed rice protein is a rice protein hydrolysate having a protein content of at least 70 wt %, preferably at least 75 wt %, more preferably at least 80 wt %, most preferably about 80 wt %, based on the total weight of the rice protein hydrolysate.

According to one preferred aspect of the invention, the non-dairy drink comprises at least one free amino acid, preferably L-lysine.

According to another preferred aspect of the invention, the at least one carbohydrate comprises at least one digestible carbohydrate and at least one fibre. Preferably, the digestible carbohydrate is maltodextrin and/or the fibre is a fructo-oligosaccharide.

According to another preferred aspect of the invention, the non-dairy drink further comprises minerals and/or vitamins.

According to another preferred aspect of the invention, the non-dairy drink further comprises an emulsifier. Preferably, the emulsifier is lecithin, preferably soy lecithin.

According to another preferred aspect of the invention, the non-dairy drink further comprises a stabilizer. Preferably it comprises carrageenan.

According to another preferred aspect of the invention, the non-dairy drink further comprises at least one mineral selected from a magnesium salt, a potassium salt, a sodium salt and a calcium salt. Preferably the at least one mineral is selected from magnesium chloride, potassium chloride, disodium phosphate, di-potassium phosphate and calcium carbonate. Preferably the non-dairy drink comprises all of these minerals.

According to another preferred aspect of the invention, the non-dairy drink further comprises at least one vitamin.

According to another preferred aspect of the invention, the non-dairy drink is in liquid form, preferably it is a ready-to-drink non-dairy drink.

In one particular aspect of the invention, the non-dairy drink comprises:
 a protein component consisting of a pea protein isolate, a rice protein hydrolysate, such as defined above, and the free amino acid L-lysine, wherein the pea protein is present in an amount of 60 to 90 wt %, preferably 60 to 80 wt %, based on the total weight of the protein component;
 vegetable oil;
 lecithin;
 a digestible carbohydrate;
 a fibre;
 minerals; and
 vitamins.
Preferably it further contains a stabilizer.

In another particular aspect of the invention the non-dairy drink comprises:
 a protein component consisting of a pea protein isolate, a rice protein hydrolysate, such as defined above, and the free amino acid L-lysine, wherein the pea protein is present in an amount of 60 to 90 wt %, preferably 60 to 80 wt %, based on the total weight of the protein component;
 vegetable oil;
 lecithin;
 maltodextrin;
 fructo-oligosaccharides;
 magnesium chloride;
 potassium chloride;
 disodium phosphate;
 dipotassium phosphate;
 calcium carbonate,
 vitamins; and
 a stabilizer;
Preferably the stabilizer is carrageenan.

In another preferred aspect of the invention, the non-dairy drink is selected from Samples 2 or 3 provided in Table 1 below.

Use of Pea Protein to Improve the Sensory Properties of Hydrolysed Rice Proteins Pea proteins can advantageously be used to improve the taste of a protein component consisting of hydrolysed rice protein, optionally with free amino acids. The presence of the pea proteins reduces the bitterness, burnt, hydrolysed and astringent tastes imparted by hydrolysed rice proteins in a significant manner, provided that the pea proteins are present in an amount of at least 10 wt % based on the total protein content. The pea protein is used in an amount of 10 to 90 wt %, preferably 10 to 80 wt %, based on the total weight of protein. In another embodiment, the pea protein is used in an amount of 20 to 90 wt %, more preferably 20 to 80 wt % or in an amount of 40 to 90 wt %, more preferably 40 to 80 wt %, or in an amount of 60 to 90 wt %, more preferably. 60 to 80 wt %, based on the total protein content.

The pea protein source can be provided in various formats, such as in the form of a concentrate, of an isolate, of an hydrolysate or of pea flour. The type of protein source will be selected based on various criteria, such as the protein content in the ingredient and the type of drink. For example pea flour may be used for infant cereal drinks or for other drinks where a higher viscosity is desired. Such protein ingredients typically are a not pure proteins but may comprises other compounds. The percentages recited in the present application refer to the pure protein content originating from the ingredient.

The pea proteins, as defined above may be intact, hydrolysed or a mixture of intact and hydrolysed proteins. The hydrolysed proteins may be partially or extensively hydrolysed. The hydrolysed rice protein may be partially or extensively hydrolysed.

In a preferred aspect, the pea proteins, the hydrolysed rice proteins and the optional free amino acid form the whole protein content of the non-dairy drink.

Use of Hydrolysed Rice Protein to Improve the Sensory Properties of Pea Proteins Rice proteins, preferably hydrolysed rice proteins, can advantageously be used to improve the taste of a protein component consisting of rice proteins and pea proteins, optionally with free amino acids. The presence of the rice proteins, preferably hydrolysed rice proteins, reduces the characteristic pea taste in a significant manner, provided that the rice proteins are present in an amount of at least 10 wt %, preferably at least 20 wt % based on the total protein content. In a preferred aspect, the rice protein is used in an amount of 10 to 90 wt % preferably 10 to 80 wt %. In a particularly preferred embodiment, the rice is provided in an amount of 10 to 40 wt %, preferably 20 to 40 wt %, based on the total weight of the protein component.

The pea and the rice protein sources can be provided in various formats, such as in the form of a concentrate, of an isolate, of an hydrolysate or of a flour. The type of protein source will be selected based on various criteria, such as the protein content in the ingredient and the type of drink. For example flour may be used for infant cereal drinks or for other drinks where a higher viscosity is desired. Such protein ingredients typically are a not pure proteins but may comprises other compounds. The percentages recited in the present application refer to the pure protein content originating from the ingredient.

The pea and the rice proteins, may be intact, hydrolysed or a mixture of intact and hydrolysed proteins. The rice protein source is preferably a rice protein hydrolysate. The hydrolysed proteins may be partially or extensively hydrolysed.

In a preferred aspect, the pea proteins, the hydrolysed rice proteins and the optional free amino acid form the whole protein content of the non-dairy drink.

Use for Providing Nutrition

The non-dairy drink of the present invention is particularly suitable for providing nutrition to an individual in need thereof, such as an infant, a young child, a child or an adult. Preferably, the non-dairy drink of the present invention is for providing nutrition to a young child or to a child. The non-dairy drink of the present invention is particularly advantageous in that the protein component has a balanced amino acid profile, as explained in details above.

The present invention will now be described in further details by the way of the following examples.

Example 1

Sensory Evaluation of Non-Dairy Drinks in Ready-To-Drink Form Having Various Ratio of Pea and Rice Proteins In order to assess the impact of the hydrolysed rice/pea protein ratio on sensory properties of a growing-up drink composition, sensory profiling was carried out with a trained sensory panel specialised in the objective evaluation of infant formula and growing-up milks. The following attributes were assessed: bitterness, hydrolysed notes and burnt notes (all commonly imparted by the presence of hydrolysed rice proteins), astringency and pea taste. Six samples with different rice/pea ratios were subjected to the panellists (N=11 panellists). The samples were prepared by mixing the Rice Base Composition and the Pea Base Composition to a total of 900 mL according to Table 1.

TABLE 1

Composition of the six samples of ready-to-drink growing-up drink

| Sample # | Rice/pea protein ratio [wt %] | Amount of Rice Base Composition [mL] | Amount of Pea Base Composition [mL] |
|---|---|---|---|
| 1 | 0/100 | 0 | 900 |
| 2 | 20/80 | 180 | 720 |
| 3 | 40/60 | 360 | 540 |
| 4 | 60/40 | 540 | 360 |
| 5 | 80/20 | 720 | 180 |
| 6 | 100/0 | 900 | 0 |

The Rice Base Composition and the Pea Base Composition had the ingredients indicated in Table 2. The Rice Base composition had a rice protein hydrolysate as sole source of protein and the Pea Base Composition had pea protein as sole source of protein.

All six samples were presented in parallel and in a randomized order by using 3-digit codes. Panellists tasted the samples at ambient temperature in 50 mL transparent plastic beakers and under red light in sensory tasting booths in order to exclude bias based on possible colour differences. For each sample the panellists were requested to rate the intensity of the single attributes according to the following scale from 0 to 10:

0=not perceivable
1-3=slightly perceivable
4-7=clearly perceivable
8-10=intensively perceivable

TABLE 3

Composition of the Rice Base Composition and Pea Base Composition

| Ingredient | Amount in Pea Base Composition [wt %] | Amount in Rice Base Composition [wt %] |
|---|---|---|
| Rice protein hydrolysate[1]) | 0.0000 | 2.0200 |
| Pea protein isolate [2]) | 2.0625 | 0.0000 |
| L-Lysine monohydrochloride | 0.0500 | 0.0520 |
| Vegetable Oil | 2.8000 | 2.8000 |
| Lecithin Soy | 0.0560 | 0.0560 |
| Maltodextrin Powder | 8.1000 | 8.1000 |
| Fructo-oligosaccharides | 0.4550 | 0.4550 |
| Magnesium chloride | 0.0350 | 0.0400 |
| Potassium chloride | 0.0680 | 0.0300 |
| Disodium phosphate | 0.0350 | 0.0200 |

TABLE 3-continued

Composition of the Rice Base Composition and Pea Base Composition

| Ingredient | Amount in Pea Base Composition [wt %] | Amount in Rice Base Composition [wt %] |
|---|---|---|
| Di Potassium Phosphate | 0.2500 | 0.2600 |
| Calcium carbonate | 0.2150 | 0.2150 |
| Trace elements premix [3] | 0.0320 | 0.0320 |
| Vitamin premix [4] | 0.0350 | 0.0350 |
| Carrageenan | 0.0150 | 0.0150 |
| Water | 85.8340 | 85.8700 |

[1] Rice Protein IsoL Hydrorice RPS; Origin: Pevesa Biotech; protein content: 80 g per 100 g of ingredient
[2] PROPEA80 NB28; Origin: Pevesa Biotech; protein content: 79 g per 100 g of ingredient
[3] TE067; Origin: Nestlé
[4] B6 NUTR19119; Origin: Nestlé

The results are provided on Tables 4 to 8 below. Scores that are not statistically significantly different from each other are designated by an "X" in the "statistical significance column".

TABLE 4

Results of assessment of bitter taste in Samples 1 to 6

| Sample # | Rice/pea protein ratio [wt %] | Mean score for bitter | Significance Statistical | | |
|---|---|---|---|---|---|
| 1 | 0/100 | 0.28 | X | | |
| 2 | 20/80 | 0.26 | X | | |
| 3 | 40/60 | 0.59 | X | | |
| 4 | 60/40 | 1.06 | | X | |
| 5 | 80/20 | 1.95 | | | X |
| 6 | 100/0 | 2.79 | | | | X |

TABLE 5

Results of assessment of hydrolysed notes in Samples 1 to 6

| Sample # | Rice/pea protein ratio [wt %] | Mean score for hydrolysed | Significance Statistical | | |
|---|---|---|---|---|---|
| 1 | 0/100 | 0.23 | X | | |
| 2 | 20/80 | 0.27 | X | | |
| 3 | 40/60 | 0.38 | X | | |
| 4 | 60/40 | 0.94 | | X | |
| 5 | 80/20 | 1.23 | | X | |
| 6 | 100/0 | 1.63 | | | X |

TABLE 6

Results of assessment of burnt notes in Samples 1 to 6

| Sample # | Rice/pea protein ratio [wt %] | Mean score for burnt | Statistical significance | |
|---|---|---|---|---|
| 1 | 0/100 | 0 | X | |
| 2 | 20/80 | 0 | X | |
| 3 | 40/60 | 0.15 | X | |
| 4 | 60/40 | 0.76 | | X |
| 5 | 80/20 | 1.65 | | |
| 6 | 100/0 | 2.72 | | |

The results in Tables 4 to 6 show that amounts from 20 wt % of pea protein, based on total protein, are sufficient to significantly reduce the bitter taste and the burnt and hydrolysed off-notes conferred by hydrolysed rice protein to a liquid growing-up drink composition. The bitterness, hydrolysed off-notes and burnt off-notes continue to reduce significantly with the increase of the amount of pea protein, up to the point where the bitterness, the hydrolysed off-notes and the burnt off-notes are not perceived significantly (not significantly different from 0). This point is achieved from an amount of 60% pea, based on total protein.

It was also an objective of the present trials to assess the impact of the different ratios of pea vs rice proteins on astringency, to assess which of these proteins was mainly contributing to the undesired astringent taste of the composition and to assess within which ratios this astringency was most reduced.

TABLE 7

Results of assessment of astringent taste in Samples 1 to 6

| Sample # | Rice/pea protein ratio [wt %] | Mean score for astringent | Significance Statistical | | |
|---|---|---|---|---|---|
| 1 | 0/100 | 1.55 | X | | |
| 2 | 20/80 | 1.59 | X | | |
| 3 | 40/60 | 1.81 | X | | |
| 4 | 60/40 | 2.43 | | X | |
| 5 | 80/20 | 3.15 | | | X |
| 6 | 100/0 | 3.66 | | | | X |

The results in Table 7 show that the rice protein is the main contributor to astringency. Amounts from 20% by weight of pea protein, based on total protein, were able to reduce the astringency of the composition in a statistically significant manner. Lowest perception of astringency was provided with from amounts of pea of 60% or more, based on total protein. From this amount the astringency is very low is not significantly different from the astringency of a composition without rice protein.

The present trials also aimed at finding out which amounts of pea could be added without adding on overwhelming pea flavour. Indeed, for use as a non-dairy drink, pea flavour notes are not desirable.

The results in Table 8 show that the pea taste is already significantly reduced when it is admixed with 20% of rice protein, based on total protein, i.e. with amounts of pea of 80% or less. The intensity of the pea flavour is further reduced significantly with further reduction of the amount of pea protein to 60%. The present trials showed that the compositions with pea protein amounts of 40% or less based on total protein had no significantly perceivable pea flavour (score not significantly different from zero).

TABLE 8

Results of assessment of pea flavour notes in Samples 1 to 6

| Sample # | Rice/pea protein ratio [wt %] | Mean score for pea flavour | Significance Statistical | |
|---|---|---|---|---|
| 1 | 0/100 | 2.83 | | X |
| 2 | 20/80 | 2.30 | X | |
| 3 | 40/60 | 1.50 | X | |

TABLE 8-continued

Results of assessment of pea flavour notes in Samples 1 to 6

| Sample # | Rice/pea protein ratio [wt %] | Mean score for pea flavour | Significance Statistical |
|---|---|---|---|
| 4 | 60/40 | 0.37 | X |
| 5 | 80/20 | 0 | X |
| 6 | 100/0 | 0 | X |

The combined results of the assessment of all attributes in the present example show that a significant improvement of the sensory properties of the growing-up drink was obtained with amounts of pea protein ranging from 20 to 80% of pea based on total protein, because amounts from 20% of pea protein were sufficient to significantly reduce the bitterness, the astringency and the hydrolysed and burnt off-notes, while amounts of 80% pea protein had significantly reduced pea taste compared to pure pea protein. The range of 20 to 80% is therefore a range where the sensory characteristics of the growing-up drink are significantly improved over pure pea protein and over pure rice protein.

Amounts of pea from 60% were successful in reducing the hydrolysed, burnt and bitter off-notes to an un-perceivable level (mean score below 1). Amounts of pea ranging from 60 to 90% and 60 to 80% of pea, based on the total weight of the protein component had a particularly balanced flavour, because of the disappearance of the hydrolysed, burnt and bitter off-notes and the disappearance of the astringency brought by the hydrolysed rice, coupled with a statistically significant reduction of the characteristic pea taste. Such compositions therefore had a very desirable bland taste, particularly suitable for use in non-dairy drinks.

Example 2

Growing-Up Drink in Powder Form According to the Present Invention

A growing-up drink was prepared having the following ingredients in the amounts indicated.

TABLE 9

Composition of the growing-up drink

| Ingredient | Amount [wt %] |
|---|---|
| Rice protein hydrolsate[1] | 3.19 |
| Pea protein isolated[2] | 11.73 |
| Amino Acid L-Methionine | 0.05 |
| Amino Acid L-Lysine | 0.12 |
| Maltodextrin | 47.70 |
| Starch | 8.00 |
| Soluble Fiber | 3.10 |
| Vitamin Premix[3] | 0.30 |
| Trace Element Premix[4] | 0.30 |
| Vegetable Oil | 19.20 |
| Soy lecithin | 1.90 |
| Mineral salts | 4.40 |

[1] Hyprol 5312; Origin: Kerry; protein content in the ingredient: 75.8%
[2] Pisane C9; Origin: Cosucra; protein content in the ingredient: 80%
[3] TE067; Origin: Nestlé
[4] B6 NUTR19119; Origin: Nestlé

The amount protein component of this growing drink consists to pea protein, rice protein and free amino acids, with pea in an amount of 80 wt %, based on total protein.

Example 3

Growing-Up Drink in Powder Form According to the Present Invention

A growing-up drink was prepared having the following ingredients in the amounts indicated.

TABLE 10

Composition of the growing-up drink

| Ingredient | Amount [wt %] |
|---|---|
| Rice protein hydrolsate[1] | 6.39 |
| Pea protein isolate[2] | 8.97 |
| Amino Acid L-Methionine | 0.03 |
| Amino Acid L-Lysine | 0.12 |
| Maltodextrin | 47.30 |
| Starch | 8.00 |
| Soluble Fiber | 3.10 |
| Vitamin Premix[3] | 0.30 |
| Trace Element Premix[4] | 0.30 |
| Vegetable Oil | 19.20 |
| Soy lecithin | 1.90 |
| Mineral salts | 4.40 |

5) Hyprol 5312; Origin: Kerry; protein content in the ingredient: 75.8%
6) PurisPea 870H; Origin: Cargill; protein content in the ingredient: 78.5%
7) TE067; Origin: Nestlé
8) B6 NUTR19119; Origin: Nestlé

The amount protein component of this growing drink consists to pea protein, rice protein and free amino acids, with pea in an amount of 60 wt %, based on total protein.

Example 4

Amino Acid Profiles of Pea and Hydrolysed Rice Ingredients

The amino acid profile of one pea isolate (Pisane C9; origin: Cosucra) and of one rice hydrolysate (Hyprol 5312; origin: Kerry) has been assessed. The content of amino acids cysteine, methionine, lysine, phenylalanine and tyrosine, tryptophan, threonine, isoleucine, leucine, valine and histidine was analysed in each ingredient using standard analysis methods. Also the total nitrogen content was measured in each of the ingredients and the total amount of protein in the ingredient was then determined by applying to the total nitrogen content a conversion factor of 6.25. The amount of each of the amino acids was then expressed in mg per gram of protein for each of the ingredient.

The results are provided in FIGS. 1 and 2, in comparison with the FAO recommendation for two age classes: infants and children between 6 and 36 months of age, as well as children older than 3 years and adults. It is visible from FIG. 1 that the pea ingredient and the hydrolysed rice ingredient each complies with the FAO recommendation, except that total cysteine and methionine is too low in the pea protein lysine is too low in the rice protein.

This FIGURE also shows that the pea protein has a lysine amount above the recommendation, so that pea protein can compensate for the missing lysine in the rice protein. Also, the amount of total cysteine and methionine in the rice protein is above the recommendations, so that the rice protein can compensate for the missing cysteine and methionine in the pea protein.

Similar amino acid profiles are observed with different pea and rice protein sources.

The invention claimed is:

1. A non-dairy drink comprising a protein component consisting of a mixture of pea proteins and hydrolysed rice proteins and optionally free amino acids, wherein the pea proteins are present in an amount of 60 to 90 wt %, based on the total weight of the protein component.

2. The non-dairy drink according to claim 1, wherein the pea proteins are present in an amount of 60 to 80 wt %, based on the total weight of the protein component.

3. The non-dairy drink according to claim 1, wherein the protein component consists of the pea proteins and the hydrolysed rice proteins.

4. The non-dairy drink according to claim 1 comprising a fat component and a carbohydrate component.

5. The non-dairy drink according to claim 1, comprising starch.

6. The non-dairy drink according to claim 1, comprising L-Lysine and/or L-Methionine.

7. The non-dairy drink according to claim 1, wherein the pea proteins are pea protein isolate, the hydrolysed rice proteins are rice protein hydrolysate, and the protein component consists of the pea protein isolate, the rice protein hydrolysate, and free amino acid L-lysine; and the non-dairy drink further comprises:
vegetable oil;
lecithin;
a digestible carbohydrate;
a fibre;
minerals; and
vitamins.

8. A method to improve sensory properties of a non-dairy drink, the non-dairy drink comprising hydrolysed rice proteins, the method comprising adding pea proteins to the non-dairy drink which comprises the hydrolysed rice proteins, wherein the pea proteins are used in an amount of at least 10 wt %, based on total protein content in the non-dairy drink.

9. The method according to claim 8, wherein the pea proteins are used in an amount at least 20 wt %, based on the total protein content in the non-dairy drink.

10. The method according to claim 8, wherein the pea proteins and the hydrolysed rice proteins form the whole protein content of the non-dairy drink.

* * * * *